O. S. WAGNER.
AUTOMATIC STOCK FEEDER.
APPLICATION FILED AUG. 27, 1919.
1,362,974.
Patented Dec. 21, 1920.
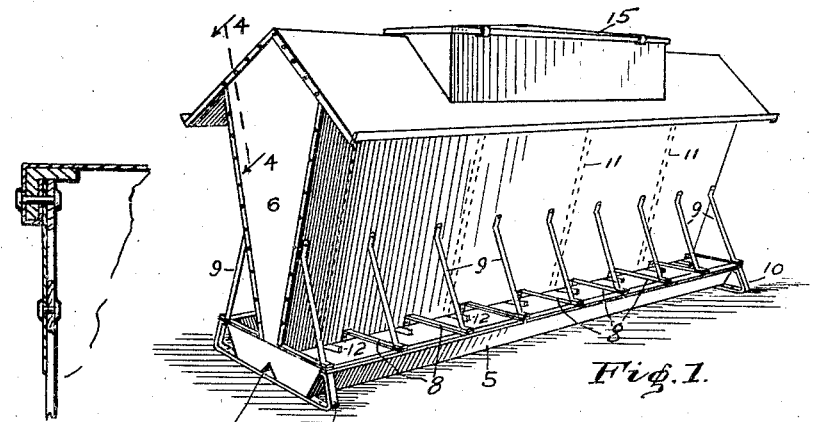
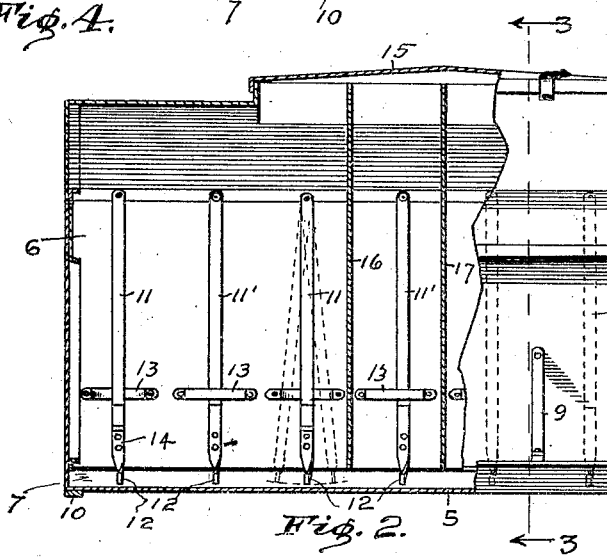
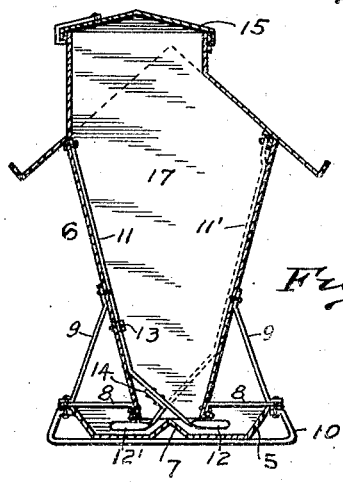
Inventor,
Orlando S. Wagner,
By Joseph A. Minturn
Attorney.

UNITED STATES PATENT OFFICE.

ORLANDO S. WAGNER, OF FRANKLIN, INDIANA.

AUTOMATIC STOCK-FEEDER.

1,362,974.            Specification of Letters Patent.        Patented Dec. 21, 1920.

Application filed August 27, 1919. Serial No. 320,217.

*To all whom it may concern:*

Be it known that I, ORLANDO S. WAGNER, a citizen of the United States, residing at Franklin, in the county of Johnson and State of Indiana, have invented a new and useful Automatic Stock-Feeder, of which the following is the specification.

This invention relates to devices for feeding and fattening live stock and is here shown as adapted for feeding hogs but it is not limited thereto in its adaptability.

The object of the invention is to provide storage for an ample supply of shelled corn, tankage or dry mill feed for a day or more, and automatic means for feeding it in regulated quantities within reach of the animals as fast as they are able to consume the feed thus automatically delivered to them, and to provide means for keeping the unconsumed portions in a dry and sanitary condition, for, unless it is kept free from an excess of moisture it is liable to pack and clog the apparatus.

A further object is to provide a device with compartments wherein several kinds of feed may be independently supplied at the same time or all used for one kind of feed.

The object is to provide a simple, strong and durable, easily cleaned, and inexpensive device, both as to original cost, and as to after maintenance, which will have large feed-holding capacity and which will be capable of feeding a large number of animals at one time.

I accomplish the above, and other objects which will hereinafter appear, by the mechanism illustrated in the accompanying drawing, in which—

Figure 1, is a perspective view of my invention in operative position. Fig. 2 is a side elevation and partial longitudinal vertical section of same modified by the omission of the angle bar between the end and roof. Fig. 3 is a transverse section on the line 3—3 of Fig. 2 and Fig. 4 is a fragment in section on the line 4—4 of Fig. 1.

Like characters of reference indicate like parts in the several views of the drawings.

My device is preferably constructed as here shown out of galvanized sheet iron on a strengthening and stiffening frame of angle and strap iron. Its base portion is a trough 5 of a capacity to feed sixteen animals— eight at each side—at once. Extending the full length of the trough, longitudinally and centrally above it, is a hopper 6, which is filled with the feed to be delivered into the trough through the open bottom of the hopper. This open bottom terminates an appreciable distance below the level of the top edge of the trough to prevent overfilling the latter and waste of feed, and to insure a fair division to the animals on each side I prefer to form a ridge 7, with downwardly and oppositely sloping sides, in the bottom of the trough centrally of the discharge opening in the hopper. This divides the feed and directs the portions outwardly toward the animals. The lower side edges of the hopper are bent out and then double back to form an outwardly extending stiffening rib (see Fig. 3), on which downwardly bent ends of horizontal brace-bars 8 are laid and the ends riveted to the hopper. The outer ends of these bars rest upon the edges of the trough— stiffened by a similar flange which may be folded several thicknesses if desired—and from them are upwardly disposed diagonal braces 9, having suitably bent ends, the lower of which are respectively fastened to the trough and bar 8 by a rivet which unites all three members. The upper bent ends of bars 9 are riveted to the sides of the hopper. The adjacent bars 8 and 9 form a pair which separate the trough into spaces—one for each animal.

At the ends of the trough are heavier bars 10, bent out to increase the base width and then extended under the trough to support the latter.

In the space set off by each two sets of bars 8, 9, I provide an agitator which the animal operates in helping itself to the feed. It comprises a bar 11 which is loosely riveted at its upper end to the horizontal frame-bar at the top of the hopper so as to swing freely. The lower portion of the bar just above the trough is bent diagonally across the hopper as shown in Fig. 3, and the end— bent a quarter turn to bring it edge-up—is continued out into the trough under and beyond the hopper into the feeding space. This end 12 is pressed sidewise by the animal's nose so as to swing the whole about its pivot suspension, and to keep it from swinging too far so braces 8, 9, will interfere with reaching end 12, and also to prevent the inward movement transversely of the hopper I provide a strap 13, with ends bent to form stops, and feet farther out for riveting to the hopper, which I place astride bars 11, in the manner shown.

To enable the animal directly opposite to assist in the agitation, I rivet an extension 14 to bar 11 and carry the end out under the opposite side of the hopper in a similar manner to form an end 12'.

By extending the bar 11 to the top of the hopper and there pivoting it, the agitation of the feed-contents of the hopper is continued to the top of the latter and the feed is kept from sticking to the sides of the hopper; and to keep both sides of the hopper free I alternate the assembly by pivoting the first bar to, say the right side, the second bar to the left side of the hopper, the third to the right, and so on. These alternate bars are marked 11' for distinction in the drawing but their construction is the same as described for bar 11.

I prefer to cover the hopper with a gable roof having eaves of considerable projection, as shown, to better exclude rain and snow. The ends are on oblique angle irons, around the vertical flange of which the roof-sheets are wrapped in the manner shown in Fig. 4, and the hopper-ends placed toward the inside and all riveted together, which insures a tight joint. The eave-edges of the roof-sheets are flanged upwardly, as shown, to form gutters which drain the water off to the ends of the hopper instead of allowing it to fall directly into the feeding spaces of the trough.

A filling-opening, with vertical walls and a hinged top 15, is provided through the roof. The hinged top 15 is pressed and raised toward its center to shed water.

The interior of the hopper is preferably divided by two vertical transverse partitions 16 and 17, into three compartments, the middle and smaller one being designed to receive tankage when that is fed, and the two outside and larger ones to receive shelled corn and dry mill feed, as the case may be. Of course, should only one kind of feed be furnished, all three compartments may be filled with the same kind.

While I have shown and described a particular form of my device in detail, it will be understood that variations are possible without departing from the spirit of the invention, and I therefore do not desire to be limited to the exact form shown further than is required by the appended claims, and what I claim is—

1. In a stock feeding apparatus, a trough formed of sheet metal from which trough the feed is eaten by the animals a plurality from each side, the feeding places on one side being separated from those on the other side by a central longitudinal ridge formed with oppositely sloping sides from the sheet metal bottom of the trough, a hopper above and discharging into the trough above the ridge, pairs of horizontal and diagonal supports from the trough to the hopper which also serve to define individual feeding places, and a plurality of agitators each comprising a bar pivoted at its upper end within the hopper to one side of the latter and terminating under the opposite side of the hopper in nose pieces which are moved by the feeding animals.

2. In a stock feeding apparatus, a trough formed of sheet metal from which trough the feed is eaten by the animals a plurality from each side, the feeding places on one side being separated from those on the other side by an angular longitudinal ridge bent out of the metal of the trough, a hopper above and discharging into the trough above the ridge, and a plurality of agitators each comprising a bar pivoted at its upper end within the hopper to one side of the latter and terminating under the opposite side of the hopper in a nose piece contacted by the feeding animal, and bar extensions from the first bar terminating in a like nose piece under the other side of the hopper.

In witness whereof I have hereunto set my hand at Indianapolis, Indiana, this 18th day of August.

ORLANDO S. WAGNER.